United States Patent [19]

Bast et al.

[11] Patent Number: 5,228,953
[45] Date of Patent: Jul. 20, 1993

[54] DEINKING WASTE PAPER USING A POLYGLYCOL AND A PHOSPHORIC ESTER MIXTURE

[75] Inventors: Inge Bast, Schriesheim; Margarete Scholl, Mannheim, both of Fed. Rep. of Germany

[73] Assignee: BK Ladenburg GmbH Gesellschaft fuer chemische Erzeugnisse, Ladenburg, Fed. Rep. of Germany

[21] Appl. No.: 783,698

[22] Filed: Oct. 30, 1991

[30] Foreign Application Priority Data

Oct. 30, 1990 [DE] Fed. Rep. of Germany ....... 4034457

[51] Int. Cl.$^5$ ................................................. D21C 5/02
[52] U.S. Cl. ........................................... 162/5; 162/6; 162/8
[58] Field of Search ................ 162/5, 55, 8, 6

[56] References Cited

U.S. PATENT DOCUMENTS

| | | | |
|---|---|---|---|
| 3,069,308 | 12/1962 | Lissant | 162/5 |
| 3,635,789 | 1/1972 | Green, Jr. | 162/5 |
| 3,846,227 | 11/1974 | Mestetsky et al. | 162/5 |
| 4,276,118 | 6/1981 | Quick | 162/5 |
| 4,487,655 | 12/1984 | Noetzel | 162/5 |
| 4,561,933 | 12/1985 | Wood et al. | 162/5 |
| 4,820,379 | 4/1989 | Darlington | 162/5 |

FOREIGN PATENT DOCUMENTS

| | | | |
|---|---|---|---|
| 3435236 | 6/1985 | Fed. Rep. of Germany | 162/5 |
| 51891 | 4/1980 | Japan | 162/5 |
| 2250291 | 10/1987 | Japan | 162/5 |

*Primary Examiner*—Karen M. Hastings
*Attorney, Agent, or Firm*—Foley & Lardner

[57] ABSTRACT

A process for the recovery of fibers by means of flotation de-inking of waste paper which bears ink applied by flexographic printing or xerography, by reducing the paper to fibers in an aqueous medium with the addition of bleaching chemicals and auxiliaries containing peroxide, fatty acids, complexing agent, sodium hydroxide, and an additive based on polyglycol and a phosphoric ester mixture, produces fibers which are free from ink, which are useful as a recyclable material.

15 Claims, No Drawings

DEINKING WASTE PAPER USING A POLYGLYCOL AND A PHOSPHORIC ESTER MIXTURE

BACKGROUND OF THE INVENTION

The present invention relates to a process for the reprocessing of waste paper, particularly printed papers which are difficult to recycle.

Due to our awareness of environmental matters, from the throw-away society of the 1960s, a trend towards extensive recycling has taken place. As far as paper usage is concerned, which has increased considerably in recent years, this means that waste paper as a raw material is no longer used only for packaging materials and hygiene products, but is becoming increasingly more important for high-quality varieties of paper. Because of the increased return of secondary fibers into the circulation of paper, some of the cellulose pulp can be saved. In this way, the environmental burden due to the chlorine bleach associated with the manufacture of cellulose pulp is also reduced.

The use of secondary fibers for high-quality papers requires the removal of impurities some of which are brought into the system as auxiliary products, to the greatest possible extent. In order to obtain a fiber stock with a high degree of whiteness, the print particles must be released from the fiber and removed. In the course of this, bleaching and de-inking processes further facilitate the improvement of the whiteness.

In the case of conventional printed matter, i.e., newspapers and magazines, printed by letterpress, gravure, or planographic methods, defibering in alkaline conditions has proven successful. In this defibering process, the separation of the fibers from the ink film is facilitated by use of mechanical forces. The addition of alkali causes, in addition to a partial saponification of the binding agent, swelling of the fibers, and thus the forcible release of the printing ink.

The removal of the printing ink from this fiber stock takes place in a second stage, where, basically, two different processes can be used, i.e., a washing process or a flotation process.

In Europe, the flotation process is used almost exclusively, while in the USA and Canada the washing process still predominates, although the trend is in the direction of flotation.

The addition of the chemicals takes place in both processes at the disintegration stage. By virtue of their good wetting capability, surfactants ease the separation of the ink particles and pigment particles from the fiber.

In order to prevent re-agglomeration of the released particles, in de-inking by washing, a dispersant is also added. The small particles of dirt remain finely divided and retain their hydrophilic character, so that they can be washed out of the fiber stock. For an optimum washing result, the dimensions of the particles should be below 15 $\mu$m since larger particles are held back by the fiber mat.

Fillers and fines are also washed out along with the dirt particles, so that in comparison with flotation de-inking, the total yield of secondary fibers is lower in the washing process.

The flotation process operates with a significantly lower consumption of water. As early as the pulping stage, a bleaching agent, usually a peroxide compound, is added in order to prevent yellowing of the fiber. In order that the peroxide compound may develop its maximum activity, it is necessary to complex heavy metals, which catalyze the breakdown of the peroxide into cleavage products having no bleaching activity. Waterglass, which because of its complexing and dispersing effect is itself very suitable for the loosening process, but leads, however, to ever increasing difficulties in the system, is being replaced more and more by organic complexing agents. Fatty acids function as collecting agents for the printing ink particles and, together with the calcium ions present in the water, form hydrophobic soaps. The dirt agglomerates are taken up by the air bubbles, swim to the surface and are separated out of the system as black foam.

Papers produced by modern printing processes such as for example, flexographic printing, xerography, and related processes cannot be recycled by the above described flotation process. The particles of carbon black and pigment, which in the case of conventional papers after defibering are still in the form of relatively large agglomerates embedded in binding material, are present in flexographic inks in their original dimensions of a only few microns, i.e., carbon black of about 0.02 to about 0.03 $\mu$m, and colored pigment of about 0.1 to about 0.4 $\mu$m.

These small dirt particles would be acceptable for removal by the washing process but are not suited to the flotation process. A further difficulty with the flexographic inks is that the acrylate-based binding agent, functions as a dispersant in alkaline medium and distributes the ink particles in the fiber suspension in the finest form.

In the case of xerographic papers, the binder consists of polymer systems which harden as a result of chemical reactions during the printing process and fix the ink film firmly onto the fibers. The resulting ink film is very elastic and cannot be separated from the fiber during the loosening process. The prepared stock, therefore, still contains many dirt specks.

The improvement in the ability to de-ink these special printing papers has already been the subject of some patents, which, however, have been unable to establish themselves in practice; see, for example, U.S. Pat. No. 4,276,118, U.S. Pat. No. 3,635,789, U.S. Pat. No. 3,846,227, and U.S. Pat. No. 4,561,933.

SUMMARY OF THE INVENTION

It is therefore an object of the present invention to provide a process by which even flexographic and xerographic printing papers can be de-inked in a satisfactory manner.

It is further an object of the invention to provide such a process which is completely harmless from an ecological view and which does not contain any health risk for the paper manufacturer.

It is also an object of the present invention to provide such a process which is technically simple and which does not use waterglass or uses a considerably reduced amount of waterglass.

It is further an object to provide a fiber having a high degree of whiteness which is useful as a recyclable fiber, without further bleaching.

In accordance with the foregoing objectives there has been provided a process for the reprocessing of waste paper which bears ink, comprising the steps of:
 a) reducing the waste paper to fibers,
 b) adding the fibers to an aqueous medium so as to form a paper stock, c) admixing the paper stock with an additive which comprises a polyglycol, wherein the ink is removed from the fibers and is floated to the surface of the medium by air bubbles, thereby forming foam comprising ink at the surface, and d) separating the foam from the medium, and recovering the fibers which are now essentially free of ink.

In accordance with another object of the invention, there is provided an essentially ink-free paper fiber which is produced by the above process.

Further objects, features, and advantages of the present invention will become apparent from the detailed description of preferred embodiments that follows.

DETAILED DESCRIPTION OF THE PREFERRED EMBODIMENTS

In the process presented, in addition to the customary flotation auxiliaries, an additive is added to the paper stock, which improves the release of the ink pigments from the fibers and at the same time condenses even the finest ink particles to floatable agglomerates so that they can be separated off.

The additive consists predominantly, preferably in in a proportion of about 60 to 100% by weight of the additive, of a polyglycol, in particular with a weight average molecular weight of about 1,000 to about 15,000 g/mol. The polyglycol is preferably of the following structure

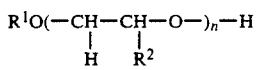

where $R^1$ is hydrogen or a $(C_1-C_6)$-alkyl group, $R^2$ is a hydrogen or a $(C_1-C_8)$ alkyl group, preferably a methyl group, and the degree of polymerization, n, is between 1 and about 135.

The additive may also include water or other polar solvents, or mixtures thereof, as required. Furthermore, the additive can contain a surfactant. Nonionogenic and acid esters and ester mixtures have proven particularly effective as surfactants, specifically wherein the alcohols employed have a chain length of $C_1$ to $C_{20}$. The surfactants are preferably contained in the additive in a concentration of up to about 10%, more preferably up to about 3%.

The glycol component, together with the binding agent of the printing ink, forms a hydrophobic structure, on which even the smallest ink particles accumulate.

The surfactant components reduce the surface tension of the water and thus enable improved wetting of the fibers. In this way, the printing inks may be more effectively released from the fibre.

By means of this dual action, not only is the degree of whiteness improved, but also the number of dirt specks, which, especially in the case of copier- and laser-printed papers, is a considerable impairment, is very much reduced.

The de-inking auxiliary described can be employed together with the fatty acids customarily used or as the sole collecting agent. The product according to the invention achieves the optimum effect at a pH of between about 8.5 and about 9 in the pulper. The reduction of the pH from the more usual 10.5 during the loosening process avoids a yellowing of the paper and economizes on the use of sodium hydroxide solution, but is still adequate to ensure activation of the peroxide.

A preferred de-inking medium usable in accordance with the invention comprises:

| | |
|---|---|
| peroxide | about 0.5–2% |
| fatty acid | about 0.5–2% |
| complexing agent | about 0.1–0.4% |
| sodium hydroxide solution | about 0.5–1% |
| polyglycol additive | about 0.1–3% |

Further customary de-inking auxiliaries can be used additionally in a known manner.

The invention will be described in more detail with reference to the following examples. It is to be understood that the examples are merely exemplary and do not limit the invention.

Additives of the following composition were used for the following trials:

| | |
|---|---|
| Additive A | 97% polyglycol monobutyl ether, wt. av. mol. wt. ca. 2,000, 3% surfactant (commercially available mixture of phosphoric acid-monomonodiesters from mixtures of i.-tridecanol and 2-ethylhexanol) |
| Additive B | 97% polyglycol, wt. av. mol. wt. 4,000, 3% about-mentioned surfactant |
| Additive C | 97% polyglycol-mono (1-methyl ethyl ether), wt. av. mol. wt. 7,000, 3% about-mentioned surfactant. |

For the laboratory trials, the corresponding paper varieties were reduced in the document shredder. The paper was then broken up in the laboratory pulper together with the de-inking solution consisting of phosphonic acid (DTPA) stabilizer, sodium hydroxide solution, fatty acid, and hydrogen peroxide at 2,800 revolutions for 15 minutes. The consistency was 3%.

Municipal water with an average hardness of 27 degrees of hardness (German) was used for the trials, the pH being adjusted to 9.

Defibering was followed by a reaction period of 90 minutes in a water bath at a temperature of 50° C. The mixture was then diluted to a consistency of 0.8% in a laboratory cell and subjected to flotation treatment for 10 minutes. At the end of the flotation treatment, the pulp was neutralized with sulfuric acid, sheets were made and the degree of whiteness determined.

The tables below illustrate the whiteness of sheets obtained using different paper varieties. R 457 and Y/C are standard procedures defining whiteness. The percentage of ingredients used in each trial is listed below the corresponding table. The percentages of each reagent is based on weight percent of the paper added. In the Table, "none" indicates that only the stabilizer, peroxide, and fatty acid were used; "additive" means that the stabilizer, peroxide, fatty acid, and additive were used; "solvent" is a comparison run in which a medium-high boiling paraffin solvent was used in place of the additive, with the stabilizer, peroxide, and fatty acid.

| Material added | Trial A: Flexographic print | | | |
|---|---|---|---|---|
| | before flotation | | after flotation | |
| | R 457 | Y/C | R 457 | Y/C |
| None | 48.0 | 53.6 | 48.5 | 53.5 |
| Additive A | 46.1 | 51.2 | 52.2 | 59.0 |

-continued

| Trial A: Flexographic print | | | | |
|---|---|---|---|---|
| Material added | before flotation | | after flotation | |
| Additive B | 46.1 | 50.9 | 51.8 | 57.9 |
| Additive C | 48.0 | 53.9 | 54.3 | 61.9 |
| 0.5% stabilizer, 0.8% peroxide, 0.5% fatty acid, 1% Additive | | | | |

| Trial B: Photocopies | | | | | |
|---|---|---|---|---|---|
| Material added | before flotation | | after flotation | | dirt |
| None | R 457 | Y/C | R 457 | Y/C | specks |
|  | 74.8 | 71.5 | 84.2 | 80.1 | 1477 |
| Solvent | 75.8 | 72.8 | 87.5 | 82.8 | 79 |
| Additive A | 72.9 | 69.8 | 91.6 | 87.3 | 97 |
| Additive B | 73.9 | 70.6 | 92.8 | 87.6 | 41 |
| Additive C | 75.2 | 70.0 | 92.7 | 87.6 | 51 |
| 0.1% stabilizer, 0.8% peroxide, 0.5% fatty acid, 0.5% additive | | | | | |

| Trial C: Laser print | | | | | |
|---|---|---|---|---|---|
| Material added | before flotation | | after flotation | | dirt |
| None | R 457 | Y/C | R 457 | Y/C | specks |
|  | 82.8 | 80.7 | 87.4 | 82.8 | 1644 |
| Solvent | 85.0 | 82.1 | 87.9 | 84.2 | 453 |
| Additive A | 84.1 | 81.6 | 89.9 | 85.8 | 87 |
| Additive B | 84.0 | 80.4 | 89.6 | 85.8 | 60 |
| Additive C | 83.7 | 80.6 | 89.7 | 85.5 | 58 |
| 0.1% stabilizer, 0.8% peroxide, 0.5% fatty acid, 0.1% additive | | | | | |

| Trial D: NCR-paper | | | | |
|---|---|---|---|---|
| Material added | before flotation | | after flotation | |
| None | R 457 | Y/C | R 457 | Y/C |
|  | 54.8 | 53.9 | 61.6 | 60.2 |
| Solvent | 61.5 | 60.3 | 65.1 | 63.6 |
| Additive A | 58.5 | 58.0 | 66.9 | 64.6 |
| Additive B | 59.0 | 58.2 | 69.0 | 67.1 |
| Additive C | 58.8 | 58.0 | 69.6 | 67.5 |
| 0.1% stabilizer, 0.8% peroxide, 0.5% fatty acid, 0.1% additive | | | | |

We claim:

1. A flotation, de-inking process for the reprocessing of waste paper which bears ink, comprising the steps of:
    a) reducing said waste paper to fibers,
    b) forming an aqueous medium of said fibers so as to form a paper stock,
    c) admixing said paper stock with an additive which comprises a polyglycol and a complex mixture of different esters, wherein the esters are formed from $C_1$–$C_{20}$ alcohols esterified with phosphoric acid, wherein said additive comprises at least 60% by weight of the additive of said polyglycol and up to about 10% by weight of the additive of said complex mixture of different esters, with said complex mixture of different esters being present in an amount effective to reduce the surface tension of the water to improve wetting of the fibers, wherein said ink is removed from said fibers and is floated to the surface of said medium thereby forming foam comprising said ink at said surface, and
    d) separating said foam from said medium, and recovering said fibers which are now essentially free of said ink.

2. A process of claim 1, wherein said aqueous medium additionally comprises,
    about 0.2 to about 2% of one or more peroxides,
    about 0.5 to about 2% of one or more fatty acids,
    about 0.1 to about 0.4% of one or more complexing agents, and
    about 0.5 to about 1% of a sodium hydroxide solution, wherein said percentages are weight percent, based on the total weight of said waste paper.

3. A process of claim 2, wherein said polyglycol is of the structure:

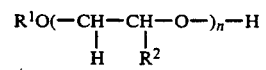

wherein $R^1$ is hydrogen or a $C_1$–$C_6$-alkyl group,
    $R^2$ is hydrogen or a $C_1$–$C_8$-alkyl group, and
    n represents the degree of polymerization and is between 1 and about 135.

4. A process of claim 3, wherein said polyglycol is a block polymer, comprising a random distribution of blocks with $R^2$ being H, and blocks with $R^2$ being methyl.

5. A process of claim 3, wherein said polyglycol comprises a mixture of polymers having a weight-average molecular weight of about 1,000 to about 15,000 g/mol.

6. A process of claim 3, wherein said additive further comprises water, polar solvents, or mixtures thereof.

7. A process of claim 3, wherein said additive is added to said medium, in amount such that the resulting medium comprises about 0.1 to about 3% by weight of said additive.

8. A process of claim 2, wherein no or substantially no water-glass is used or added during the process.

9. A process of claim 1, wherein said additive comprises up to about 3% by weight of the additive of said complex mixture of different esters.

10. A process of claim 1, wherein the pH during step c) is between about 8.5 and about 9.

11. A process of claim 1, wherein said ink is from flexographic printing or xerography.

12. A process of claim 1, wherein said waste paper is shredded before said step a).

13. A process of claim 1, wherein said steps a) and b) are performed simultaneously in a pulper, wherein said waste paper is converted into said fibers in the presence of said aqueous medium.

14. A process of claim 1, wherein said complex mixture of different esters is a mixture of esters formed from phosphoric acid and i.-tridecanol and 2-ethylhexanol.

15. A process of claim 1, wherein said additive comprises 3% by weight of the additive of said mixture of different esters.

* * * * *